(12) United States Patent
Piggott

(10) Patent No.: US 7,972,095 B2
(45) Date of Patent: Jul. 5, 2011

(54) CLAMPING DEVICE

(75) Inventor: David C. Piggott, Lakefield (CA)

(73) Assignee: Quickmill, Inc., Peterborough, Ontario (CA)

( * ) Notice: Subject to any disclaimer, the term of this patent is extended or adjusted under 35 U.S.C. 154(b) by 1028 days.

(21) Appl. No.: 11/822,871

(22) Filed: Jul. 10, 2007

(65) Prior Publication Data

US 2008/0012191 A1   Jan. 17, 2008

Related U.S. Application Data

(60) Provisional application No. 60/830,617, filed on Jul. 14, 2006, provisional application No. 60/929,511, filed on Jun. 29, 2007.

(51) Int. Cl.
*B23B 35/00* (2006.01)
(52) U.S. Cl. ......... 409/132; 408/79; 269/48.2; 411/347; 411/913; 279/2.02
(58) Field of Classification Search .......... 409/131–132; 408/1 R, 79, 103; 279/2.01, 2.02, 2.21, 2.22, 279/2.05, 2.24; 24/456, 483, 491, 535, 567; 269/48, 48.1, 48.4, 48.3, 48.2; 411/347, 411/913
See application file for complete search history.

(56) References Cited

U.S. PATENT DOCUMENTS

| | | | | |
|---|---|---|---|---|
| 892,333 A * | 6/1908 | Traub | | 403/297 |
| 1,978,935 A * | 10/1934 | Douglas | | 411/80.2 |
| 2,271,012 A * | 1/1942 | Hutchings | | 269/48.2 |
| 2,963,927 A * | 12/1960 | Hanger | | 408/79 |
| 3,202,037 A * | 8/1965 | Finkle et al. | | 269/48.3 |
| 4,850,763 A * | 7/1989 | Jack et al. | | 409/178 |
| 5,135,341 A * | 8/1992 | Leyder | | 411/182 |
| 5,164,154 A * | 11/1992 | Brown et al. | | 376/364 |
| 6,827,345 B2 * | 12/2004 | Anderson et al. | | 269/49 |

FOREIGN PATENT DOCUMENTS

FR   2919691 A1 *  2/2009
* cited by examiner

*Primary Examiner* — Daniel W Howell

(57) ABSTRACT

A temporary securing device for plate-like work pieces includes a split body and an anchor segment, the split body has a resiliently compressible biasing member to allow an outer diameter of the split body to contract allowing passage within a plurality of openings in the work pieces, the split body has an engagement portion near a first end, the engagement portion has an operative surface to engage an outer surface on a first outer work piece, the split body has a second end and a threaded inner support near the second end, the anchor segment is operable to engage an outer surface on a second outer work piece, the anchor segment includes a threaded member to engage the threaded inner support, the threaded member be rotationally operational to draw the split body toward the anchor segment.

23 Claims, 13 Drawing Sheets

CLAMPING DEVICE

REFERENCE TO CO-PENDING APPLICATIONS

The applicant claims priority benefit under Title 35, United States Code section 119(e) of U.S. Provisional application Ser. No. 60/830,617 filed Jul. 14, 2006 and entitled CLAMPING DEVICE and U.S. Provisional application Ser. No. 60/929,511 filed Jun. 29, 2007 and entitled WORK PIECE SUPPORT. The entire subject matter of U.S. Provisional application Ser. No. 60/830,617 filed Jul. 14, 2006 and entitled CLAMPING DEVICE is incorporated by reference. The entire subject matter of U.S. Provisional application Ser. No. 60/929,511 filed Jun. 29, 2007 and entitled WORK PIECE SUPPORT is incorporated by reference.

FIELD OF THE INVENTION

This invention relates in general to devices and methods for securing plate-like work pieces during machining.

DESCRIPTION OF THE RELATED ART

The precision machining of large work pieces, such as plate-like work pieces, requires the use of a wide array of machine tools such as gauges, templates, cooling systems, hydraulic clamps, and drill-sets. These tools are expensive to acquire and maintain.

Large work pieces, such as steel plates, are typically manufactured using a large gantry milling machine. In one conventional system, steel plates are stacked on a milling table and clamped at regular locations along their aligned peripheries so not to interfere with the machining process, which may involve one or more milling and/or drilling steps. A gantry is configured to move along tracks that extend parallel to the work pieces, such that the gantry provides an overhead tool head to support for one or more machining tools. The gantry may be adjusted along the length of the work pieces, and the tool head may be adjusted along x, y and z axes relative to the work pieces to machine the work pieces. As the process proceeds, there is a tendency of bulging between the work pieces as material shavings force themselves in between the work pieces. This problem is more pronounced as the size of the work pieces increase, the amount of machining that is done on the work pieces and as the distance from the clamped peripheral edges increases. For example, the problem may be come acute when the machining step occurs in a central region of these work pieces.

What is needed is a novel approach to clamping such work pieces.

SUMMARY OF THE INVENTION

In one embodiment, there is provided a temporary securing device for plate-like work pieces comprising a split body and an anchor segment, the split body having a resiliently compressible biasing member to allow an outer diameter of the split body to contract allowing passage within a plurality of openings in said work pieces, the split body having an engagement portion near a first end, the engagement portion having an operative surface to engage an outer surface on a first outer work piece, the split body having a second end and a threaded inner support near the second end, the anchor segment being operable to engage an outer surface on a second outer work piece, the anchor segment including a threaded member to engage the threaded inner support, the threaded member be rotationally operational to draw the split body toward the anchor segment.

In an alternative embodiment, the split body comprises two opposed body sections.

In an alternative embodiment, the engagement portion includes a peripheral lateral lip.

In an alternative embodiment, the operative surface of the peripheral lateral lip is inclined toward the anchor segment.

In an alternative embodiment, the resiliently compressible biasing member is a spring.

In an alternative embodiment, the split body includes one or more than one formations to engage the resiliently compressible biasing member.

In an alternative embodiment, the formation is a first cavity in each of the two opposed body sections.

In an alternative embodiment, the plurality of openings has a depth and the threaded member is selected accordingly to the depth.

In an alternative embodiment, the threaded member is a bolt.

In an alternative embodiment, the anchor segment is a cap having a hole to receive a threaded member.

In an alternative embodiment, the split body includes a second cavity to receive the threaded inner support.

In an alternative embodiment, the threaded inner support is a nut.

An alternative embodiment further comprises a restraining portion for preventing the split body from expanding beyond an operable expanded orientation.

In an alternative embodiment the spilt body further includes an outer peripheral groove to receive the restraining portion.

In an alternative embodiment the restraining portion is an o-ring.

In an alternative embodiment, the present invention provides a device for clamping a group of work pieces together, comprising a first body having a peripheral lateral surface, the first body being laterally dimensioned to pass through an inner path formed by aligned passages in the group of work pieces, the first body having a first end region with a circumferential laterally outwardly extending flange, the first body having at least two body sections, each having a corresponding portion of the peripheral lateral surface and a portion of the flange, a biasing portion positioned between the first body sections for laterally outwardly biasing the first body sections, the first body being movable from a compressed orientation in which the flange fits within the inner path, to an expanded orientation in which the flange extends laterally beyond the inner path to engage an outer surface on a first outer one of the group of work pieces, the first body having a second end region opposite the first end region with a central opening therein, an anchor portion extending between the body sections near the second end region, the anchor portion having a first threaded passage and exposed to the central opening; a second body to lie against a second one of the group of work pieces, the second body having a second passage which is alignable with the first threaded passage; a threaded member arranged to engage the first threaded passage and the second passage and to extend between the first and second bodies, the threaded member rotatably operable to draw the first and second bodies together against the first and second outer work pieces.

In an alternative embodiment, the first body is generally cylindrical in shape.

In an alternative embodiment, further includes at least one of the body sections including a first inner formation to receive the biasing portion.

In an alternative embodiment, the first inner formation includes a first cylindrical cavity.

In an alternative embodiment, the biasing portion includes a spring member.

In an alternative embodiment, the body sections includes a pair of second inner formations to receive the anchor portion.

In an alternative embodiment, the second inner formations each include a second cylindrical cavity.

An alternative embodiment further comprises a limiting portion for limiting movement of the body sections beyond the expanded orientation.

In an alternative embodiment, the outer peripheral surface includes a recess, the limiting portion including an o ring to be located in the recess.

In an alternative embodiment, the flange has a beveled peripheral edge region.

An alternative embodiment further comprises an undercut formation between the peripheral lateral surface and the circumferential laterally outwardly extending flange.

In an alternative embodiment, the peripheral lateral surface has a taper extending between the first end region and the second end region.

In an alternative embodiment, the present invention provides a device for clamping a plurality of work pieces together, comprising a body having a first portion of a first diameter and a second portion of a second diameter, the first portion having a circumferential laterally outwardly extending flange to engage an outer surface of a first work piece, the first portion further having at least two body sections, each having a corresponding portion of the flange, a biasing portion positioned between the body sections for laterally outwardly biasing the body sections, the body being operable in a first orientation with a first diameter to permit the flange to pass through a plurality of aligned passages in said work pieces and a second orientation with a second diameter to present the flange to extend beyond the aligned passages and engage an outer surface of a second work piece, the first and second portions having a threadable member to be rotatable to draw the first and second bodies together.

In an alternative embodiment, the present invention provides a kit for clamping a group of work pieces together, comprising a first body having a peripheral lateral surface, the first body being laterally dimensioned to pass through an inner path formed by aligned passages in the group of work pieces, the first body having a first end region with a circumferential laterally outwardly extending flange, the first body having at least two body sections, each having a corresponding portion of the peripheral lateral surface and a portion of the flange, a biasing portion positioned between the first body sections for laterally outwardly biasing the first body sections, the first body being movable from a compressed orientation in which the flange fits within the inner path, to an expanded orientation in which the flange extends laterally beyond the inner path to engage an outer surface on a first outer one of the group of work pieces, the first body having a second end region opposite the first end region with a central opening therein, an anchor portion extending between the body sections near the first second end region, the anchor portion having a first threaded passage and exposed to the central opening; a second body to lie against a second one of the group of work pieces, the second body having a second passage which is alignable with the first threaded passage; a plurality threaded members of various lengths each operable to be arranged to engage the first threaded passage and the second passage and to extend between the first and second bodies, each of the threaded members rotatably operable to draw the first and second bodies together against the first and second outer work pieces, an instructional manual instructing an user how to assemble the first and second bodies, how to choose the appropriate length of the threaded member and how to disengage the first and second bodies from the work pieces.

In an alternative embodiment, the present invention provides a method of machining plate-like work pieces comprising: assembling individual plate-like work pieces into a stack;
clamping an outer region of the plate-like work pieces in a manner which will not interfere with a subsequent machining operation;
drilling at least one hole through the stack;
measuring the height of the stack;
assembling a tension device with a first anchor portion, a second anchor portion and threaded member selected with a length according to the height of the stack and operable to engage the first and second anchors portions, the first anchor portion transferable between a laterally expanded orientation and a laterally contacted orientation;
manipulating the tension device to laterally contracted orientation in order to fit within the at least one hole;
passing the tension device through said hole until the first anchor portion extends beyond a first outer plate member to engage a first contact surface thereon, aligning the second anchor portion with the hole and against a second contact surface on a second outer plate member;
rotating the threadable member to draw the first and second anchor portions together;
machining the stack;
releasing the tension device from the stack; and
disassembling the plate-like work pieces from the stack.

BRIEF DESCRIPTION OF THE DRAWINGS

Several preferred embodiments of the present invention will be provided, by way of examples only, with reference to the appended drawings, wherein.

DESCRIPTION OF THE PREFERRED EMBODIMENTS

Figure 1:
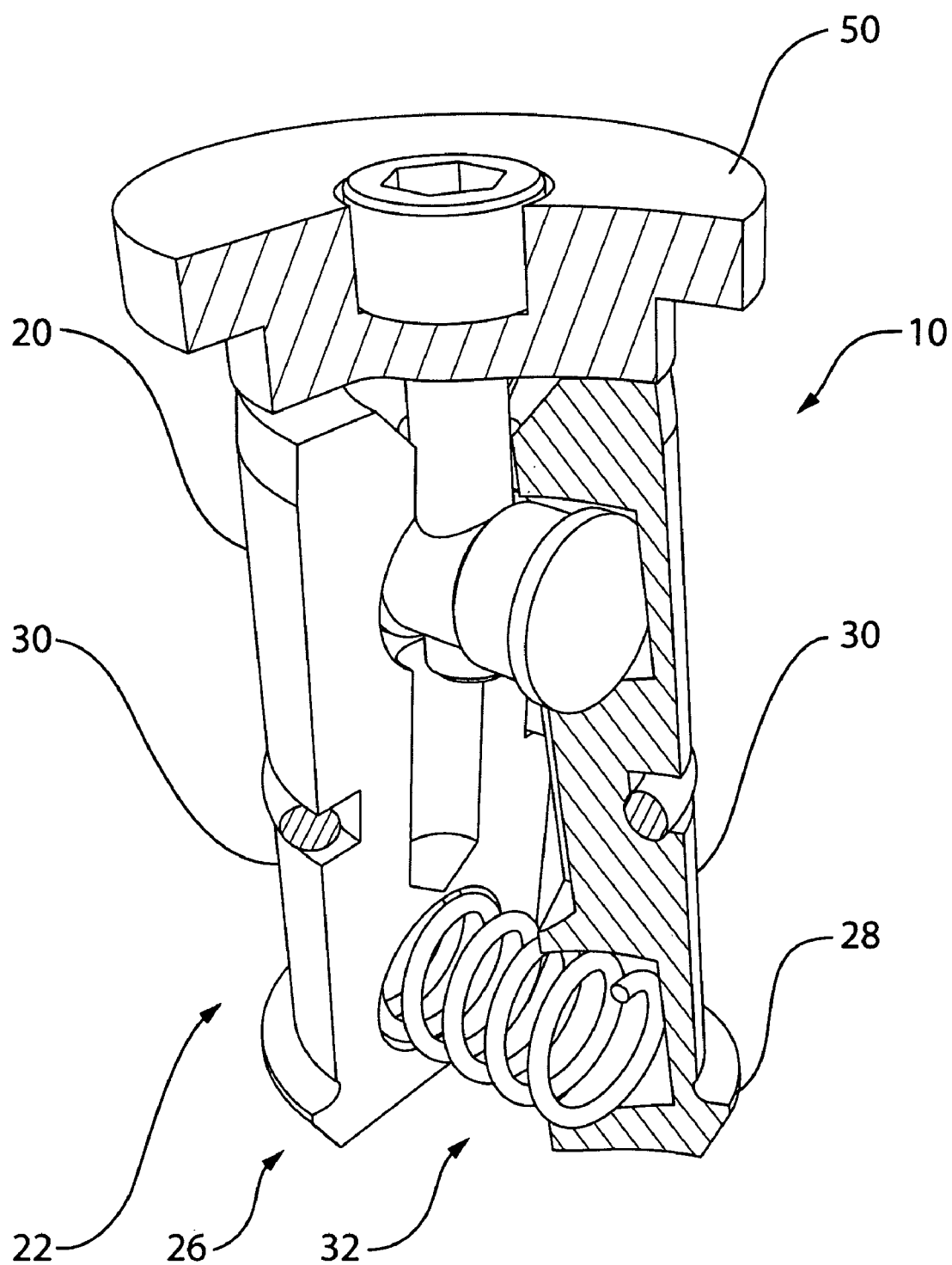
FIG. 1 is a sectional view of a device for clamping a group of work pieces.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention. However, other alternative mechanical configurations are possible which are considered to be within the teachings of the instant disclosure. Furthermore, unless otherwise indicated, the term "or" is to be considered inclusive.

Figure 2:
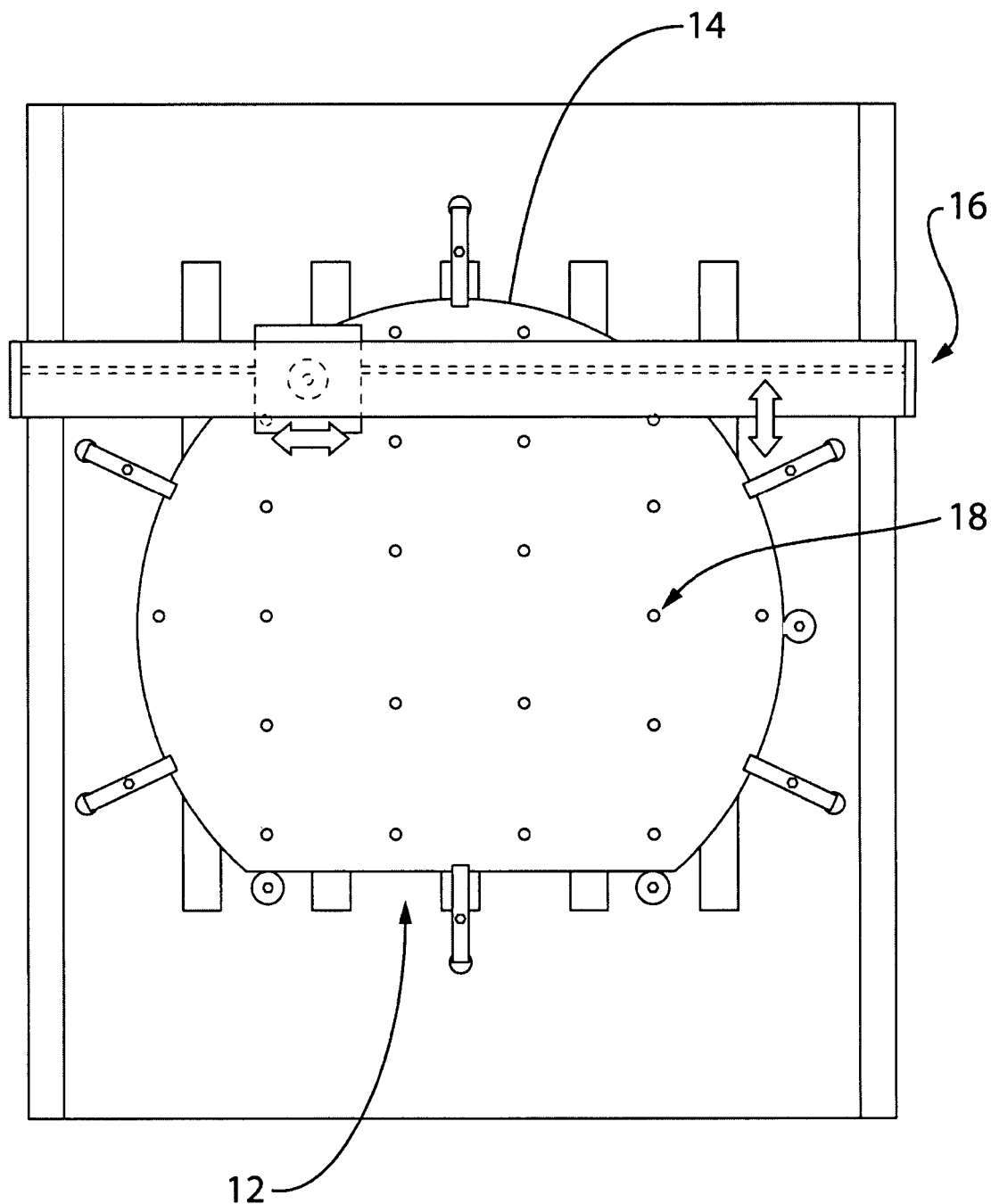
FIG. 2 is a top plan view of a machining installation for a stack of work pieces of FIG. 1.
Figure 3:
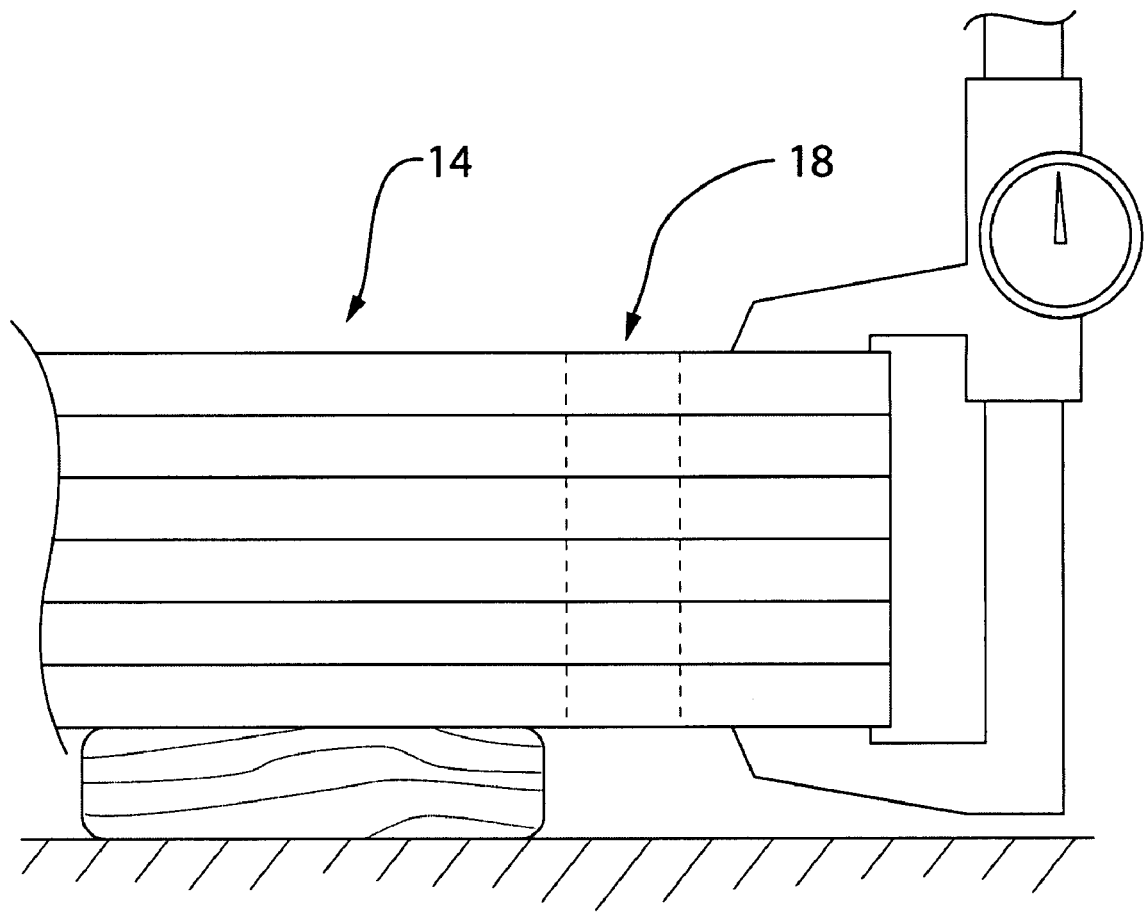
FIG. 3 is a side view of the stack of FIG. 2 in a measuring step.

Referring to the FIGS. 1 and 2, there is provided a device 10 for clamping a group of work pieces 12 together. An example of such group (or stack 14 as in this case) of work pieces is shown in FIG. 3 and in an operative position on a gantry milling machine 16 as shown in FIG. 2. FIG. 3 shows, in dashed lines, a number of aligned passages 18 in the work pieces of the stack 14.

Figure 4:
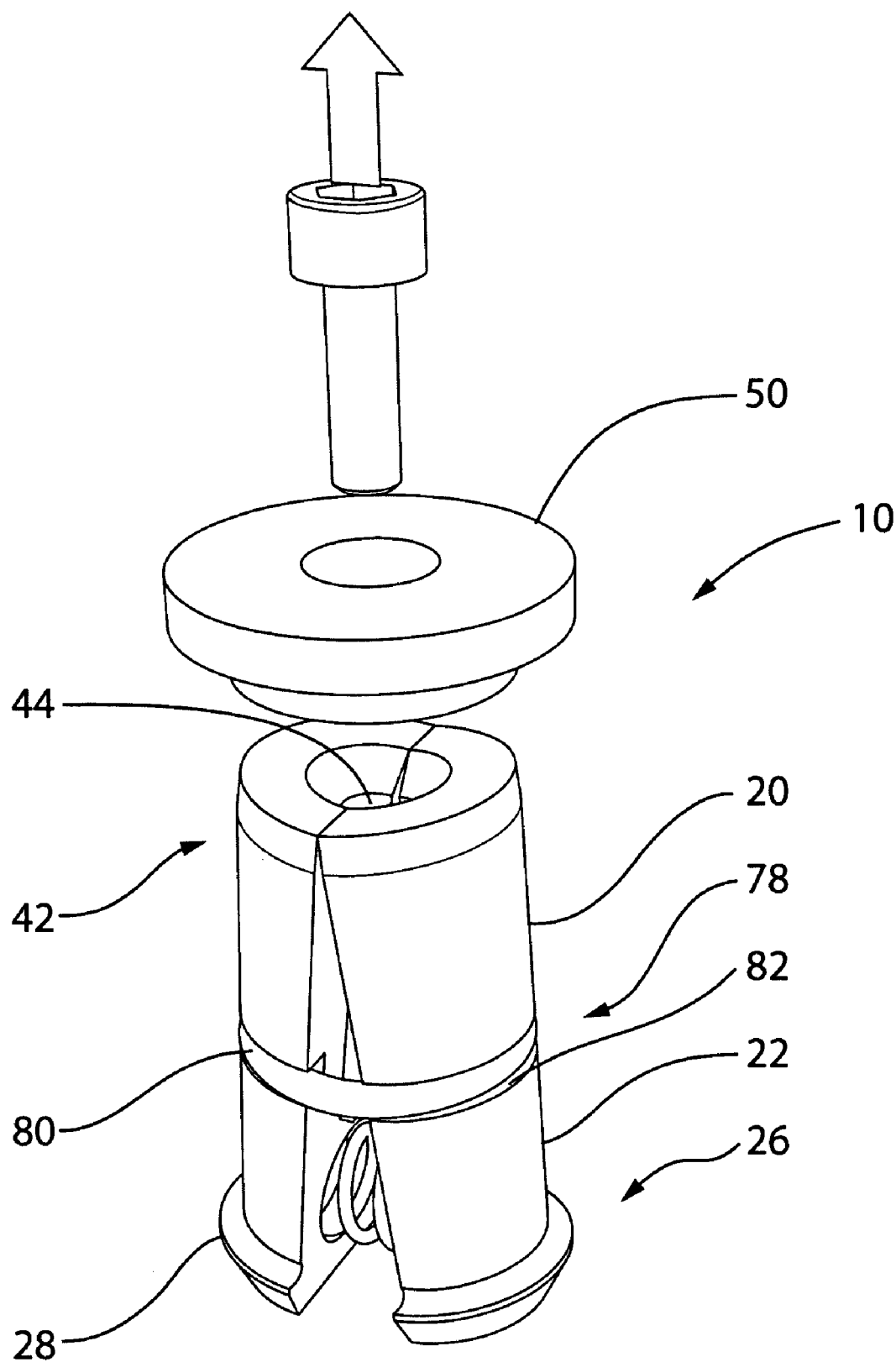
FIGS. 4 and 5 are perspective side views, of the device of FIG. 1 in alternative orientations.
Figure 7:
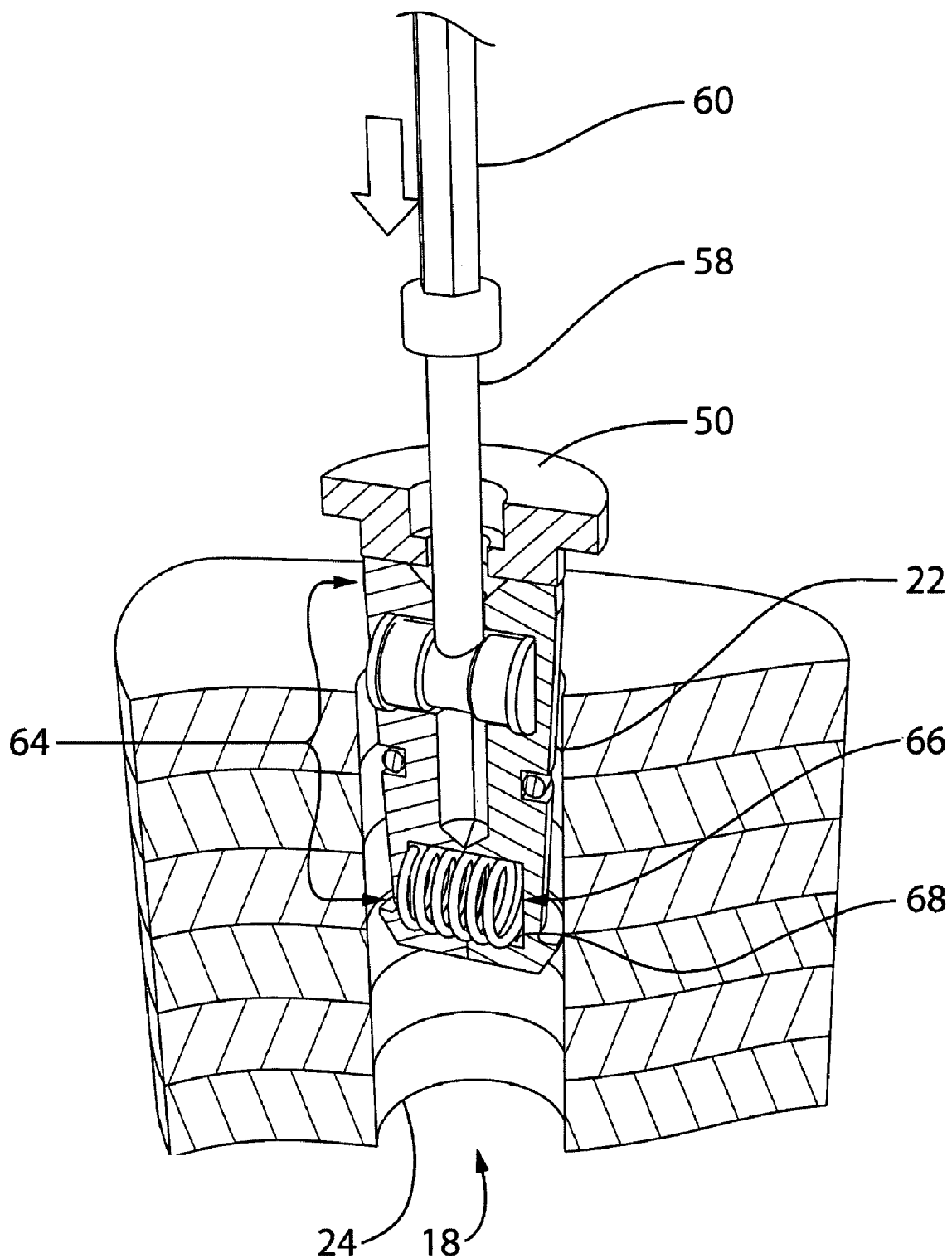

The device 10 has a first body 20 with a peripheral lateral surface 22. As shown in FIGS. 4 and 7, the first body 20 is laterally dimensioned to pass through an inner path 24 formed by the aligned passages 18. Referring to FIG. 1, the first body 20 has a first end region 26 with a circumferential laterally outwardly extending flange 28. The first body 20 also has at least two body sections 30, each bearing a corresponding portion of the peripheral lateral surface and a portion of the flange 28. A biasing portion 32 is positioned between the first body sections 30 for laterally outwardly biasing them.

Figure 8:
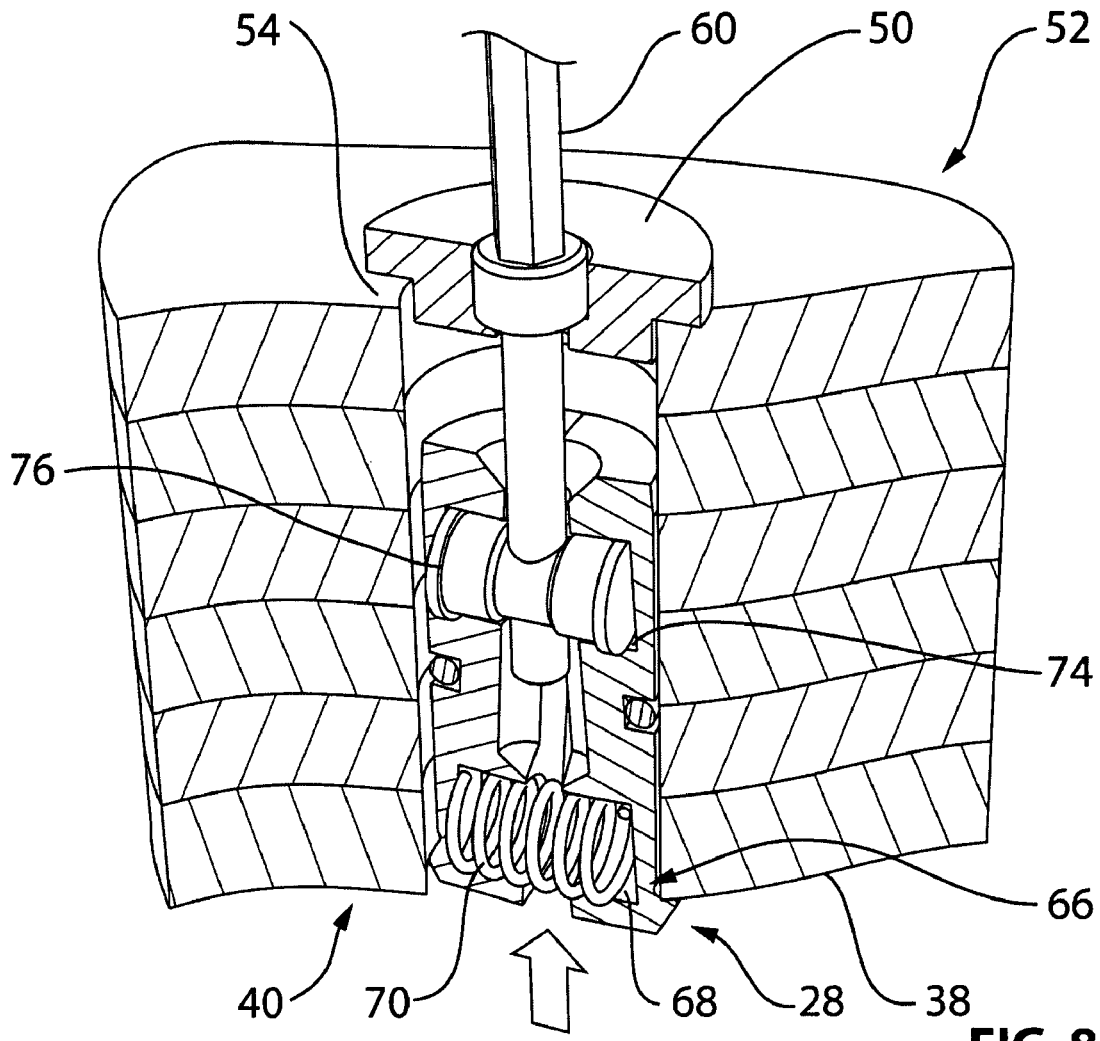

As will be described below, the first body 20 is movable between a compressed orientation, as shown in FIG. 7, in which the flange fits within the inner path 24, and an expanded orientation, as shown in FIG. 8, in which the flange 28 extends laterally beyond the inner path 24 to engage an outer surface 38 on a first outer one of the group of work pieces 40. The first body also has a relaxed orientation as shown in FIG. 1, in which it is expanded still further beyond its expanded orientation.

Referring FIG. 4, the first body 20 has a second end region 42 opposite the first end region 26 with a central opening 44 therein. An anchor portion shown in FIG. 5 at 46 extends between the body sections 30 near the second end region 42. In this case, the anchor portion 46 has a first threaded passage 48 and is exposed to the central opening 44.

Figure 5:
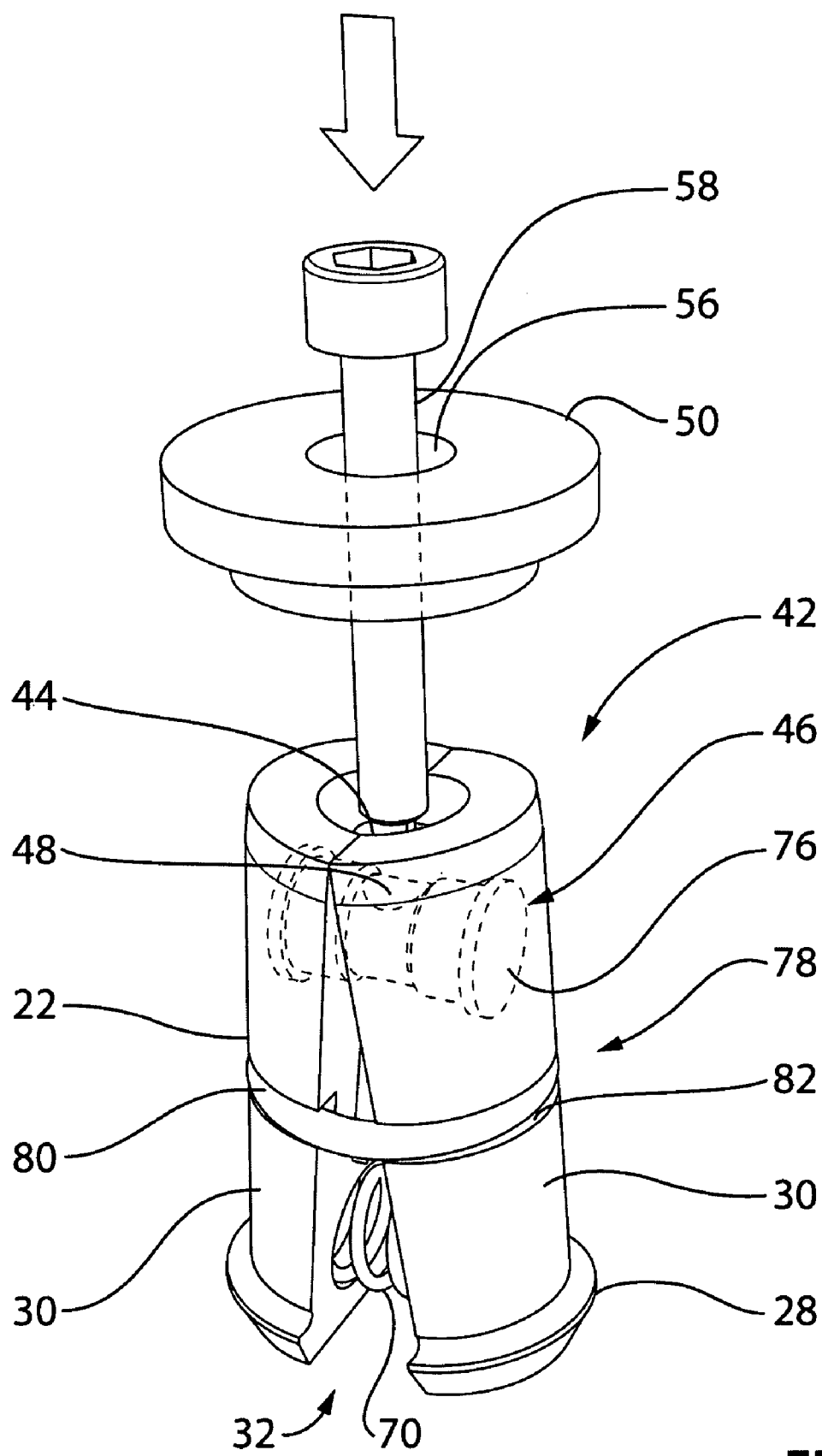

As can be seen in a number of the figures, such as FIGS. 1 and 5, the device 10 is also provided with a second body 50 to lie against a second one of the group of work pieces 52 (FIG. 8) in this case on an outer surface 54. The second body 50 has a second passage 56 which is alignable with the first threaded passage 48. A threaded member 58 is arranged to engage the first threaded passage 48 and the second passage 56 and to extend between the first and second bodies 20, 50 respectively. In this case the threaded member 58 is rotatably operable, with the help of a rotary tool shown at 60 in FIG. 6, to draw the first and second bodies 20, 50 together against the first and second outer work pieces 40, 52. Other configurations and/or tools may be employed, if desired, to drive the threaded member 58. Furthermore, other configurations may be available in which the first and or second body 20, 50 are correspondingly engaged with the first and second outer work pieces 40, 52 in different orientations. For instance, the second body 50 may engage the outer surface of the second work piece at a location distal to the inner path, or may engage an upper inner surface facing the inner path.

As shown in FIG. 1, the first body 20 is generally cylindrical in shape although the first body 20 may have other shapes and configurations, such as for instance, an oval or square cross section. As best illustrated in FIG. 7, the peripheral lateral surface 22 of the body has a taper 64 that extends between the first end region 26 and the second end region 42 or toward the second end region 42. This taper 64 enhances the effect of the biasing portion 32 to bias the first body sections 20 to a fully expanded orientation and/or to extend the flange 28 laterally beyond the inner path 24 of the outer surface 38 on the first outer one of the group of work pieces 40. Alternatively the first body 20 may have a peripheral lateral surface 22 of the body that is not tapered. For example, the peripheral lateral surface 22 may be provided with relatively consistent or varying diameter between the first end region toward and second end region.

As illustrated in FIGS. 6, 7, 8 and 8a, at least one, in this case two, of the body sections 30 includes a first inner formation 66 to receive the biasing portion 32. In this case, the first inner formation 66 is provided by a first cylindrical cavity 68, but may be provided in other forms such as, for example, a projection. The biasing portion 32 is, in this case, a spring member 70, though other resilient elements may also be used in some cases, as desired, such as for instance a rubber plug.

The body sections 30 include a pair of second inner formations 72 to receive the anchor portion 46. The second inner formations 72 each include a second cylindrical cavity 74. As shown in dashed lines in FIG. 5, the anchor 46 may be a bobbin 76 or nut or alternatively may be integrally formed with one or both of the body sections 30.

As shown in FIGS. 4 and 5, the device further includes a limiting portion 78 for limiting the movement of the body sections 30 beyond the expanded orientation. In this case the limiting portion 78 is an o ring 80 but for example, may be in some other form, such as a tension band. In this case, the outer peripheral surface 22 includes a recess 82 to accommodate the limiting portion 78, though other arrangements may be utilized to operatively associate the limiting portion 78 with the body sections.

Figure 8A:
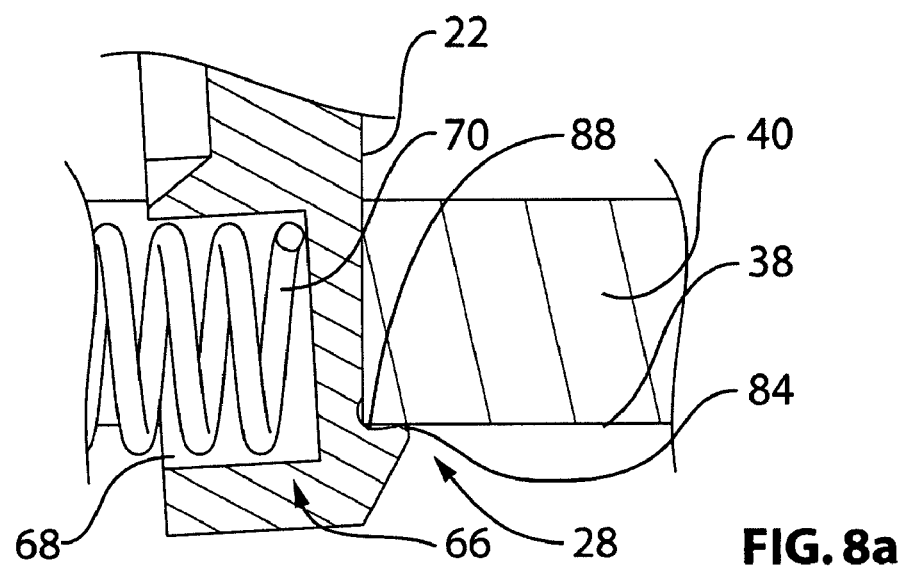
FIG. 8a is a side view of a portion of the device of FIG. 1 in an operative position according to FIG. 8.

As shown in FIG. 8a, the flange 28 has a beveled peripheral edge region 84 to assist the entry of the device 10 into the inner path 24. The flange 28 further includes an undercut formation 88 adjacent peripheral lateral surface 22 to aid in "biting" into the outer surface 38 of the first outer one of the group of work pieces 40. The device 10 may also be provided with other formations other then the undercut formation, or in some other cases, without such undercut formation.

Figure 13:
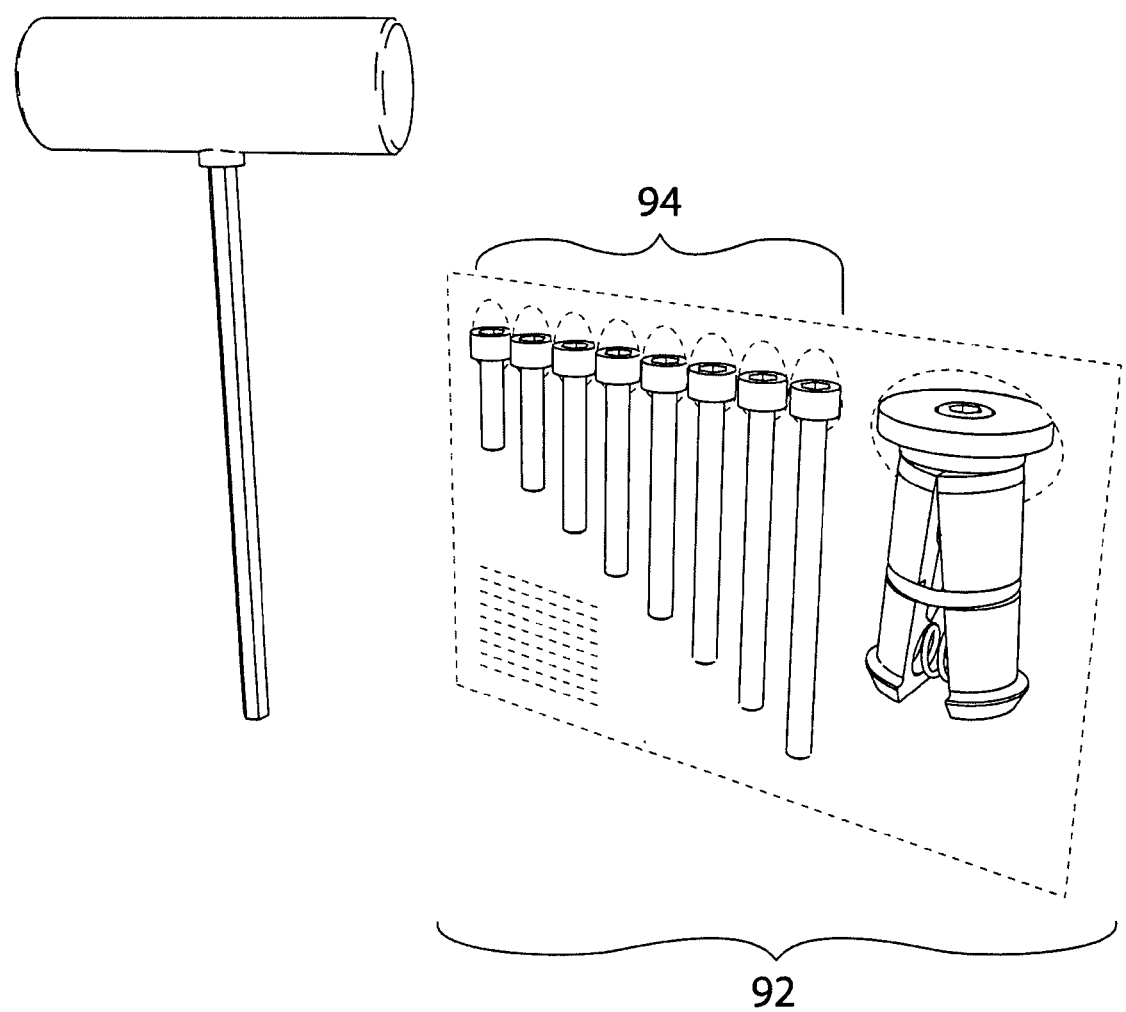
FIG. 13 is a side view of a kit.

As shown in FIG. 13, the device 10 may be provided in the form of a kit 92 with a selection of parts according to the device and configured to be useful for one or more specific installations. For instance, the kit 92 may include a number of different length threaded members 94 as shown in FIG. 13, each threaded member being appropriate for a different stack height. The kit 92 may thus include a set of instructions on the steps for selecting the appropriate threaded member. The kit 92 may in some cases not include the threaded member, thus enabling the user to obtain the threaded member from a separate source.

The device 10 may thus be used in the following manner. First, the user assembles individual plate-like work pieces into the stack 14, and clamps an outer region 96 of the plate-like work pieces 12 in a manner which will not interfere with a subsequent machining operation. The user then drills at least one hole or passage through the stack, and measures the height of the stack to determine the appropriate length of threaded member required.

The user then assembles the device with the first body 20, the second body 50 and the threaded member 58. In this case, the threaded member 58 is selected with a length appropriate for the overall thickness of the stack 14 or the overall thickness of the aligned passages 18 therein, as need be.

Figure 6:
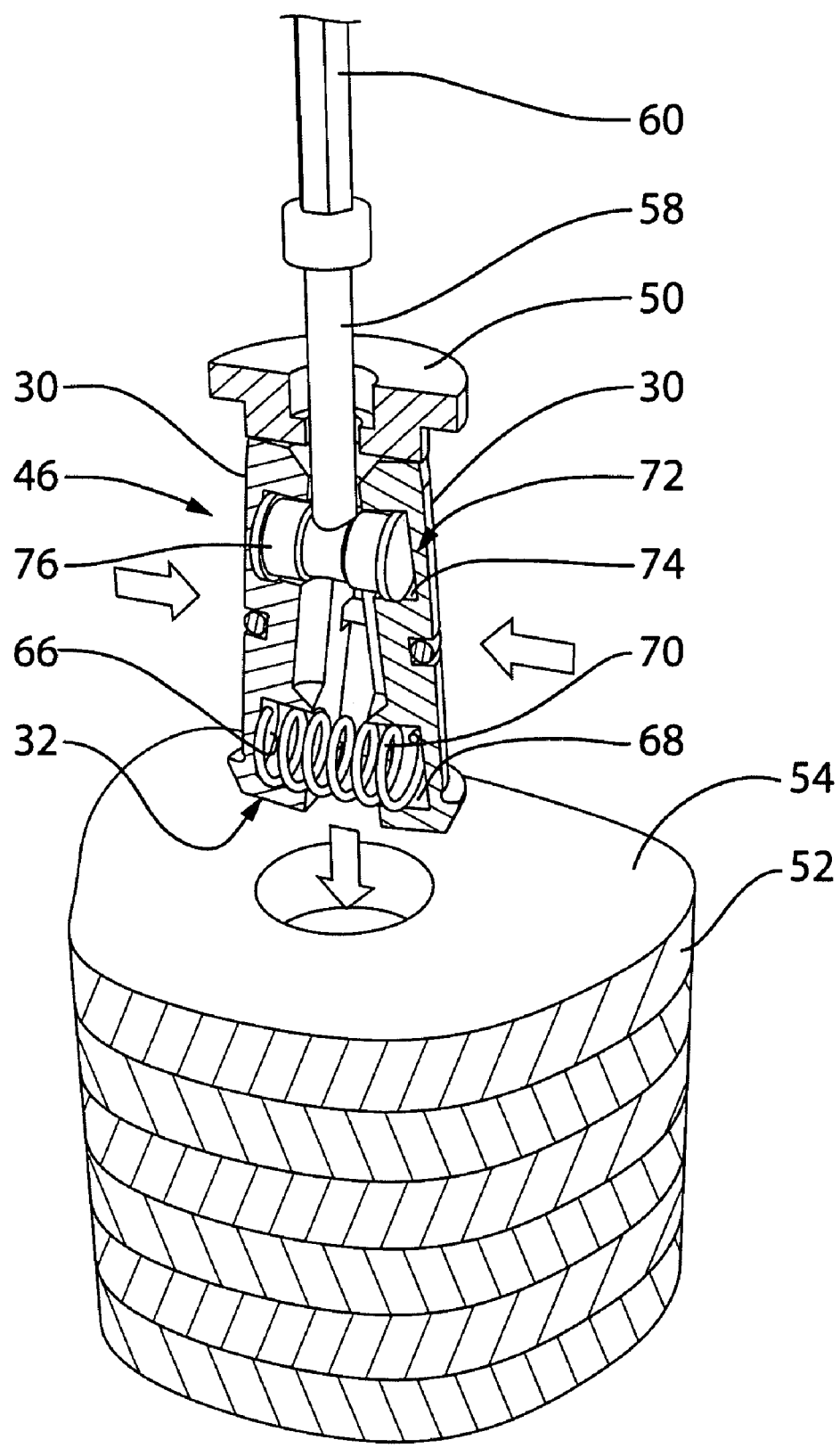
FIGS. 6, 7 and 8 are fragmentary perspective views of the stack of FIG. 2 and the device of FIG. 1 in different operative positions.

The user manipulates the device 10 to the compressed orientation in order to fit within the aligned passages 18, as shown in FIGS. 6 and 7.

The user passes the device through the aligned passages 18 until the first body extends beyond the first outer plate work piece 40 shown at to engage the first contact surface 38 thereon, as shown in FIG. 8. The user aligns the second body 50 with the aligned passages 18 and against the second contact surface 54 on the second outer plate work piece 52.

The user thus rotates the threadable member 58, such as by way of the tool 60, to draw the first and second bodies 20, 50 together to secure the stack.

Figure 9:
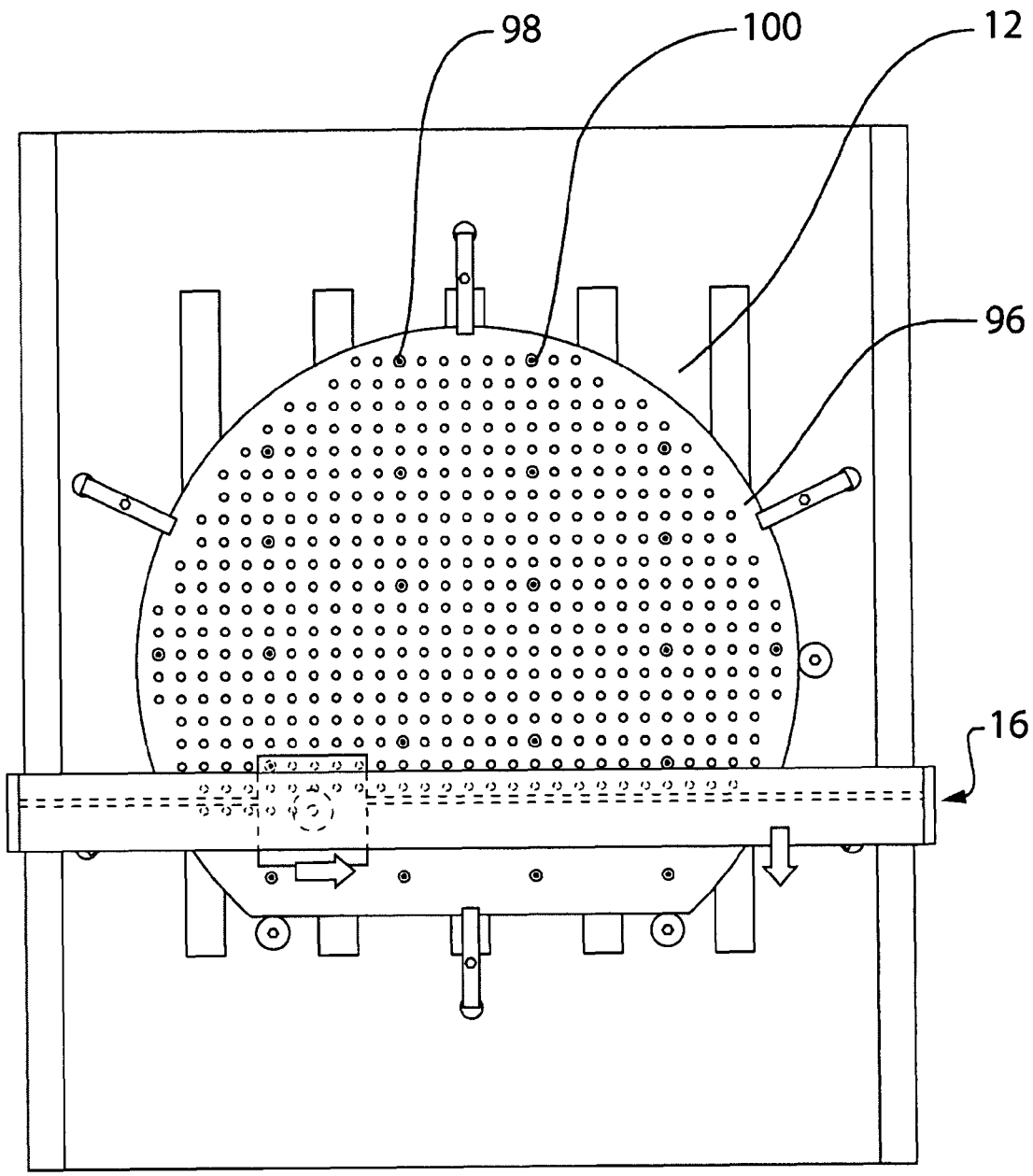
FIG. 9 is a top plan view of a machining installation of FIG. 2 with a plurality of devices of FIG. 1 in an operative orientation.
Figure 10:
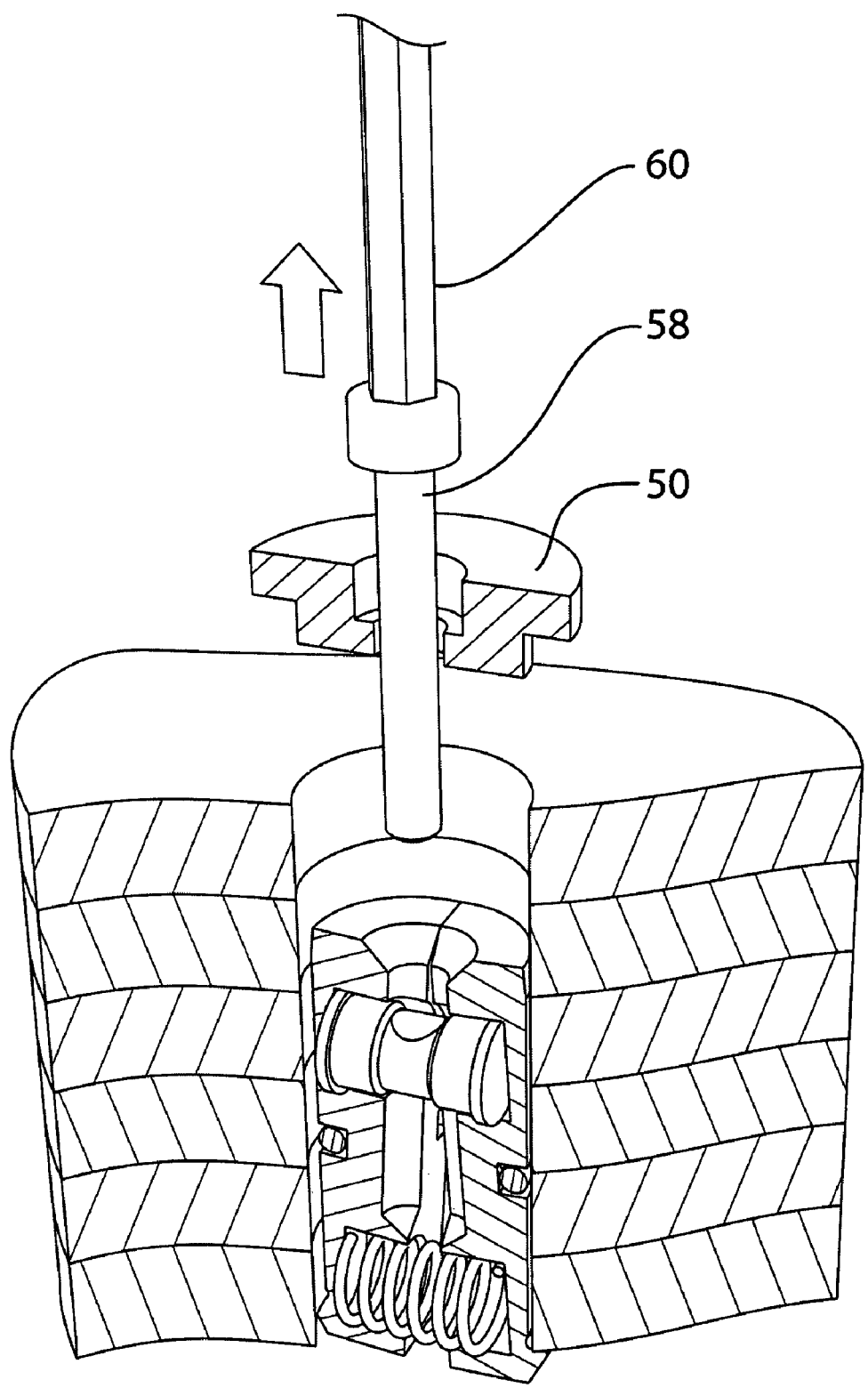
FIGS. 10, 11 and 12 are fragmentary perspective views of the stack of FIG. 2 and the device of FIG. 1 in still further different operative positions.

The user may then repeat this process for as many devices as needed in the stacked work pieces. This may involve installing a first device in a first location (as for example shown at 98 in FIG. 9) on the stack and then subsequently carrying out a number of machining steps at a predetermined vicinity of the first location and then installing a second device at a second location (as for example shown at 100 in FIG. 9) and repeating the process.

Alternatively, the user may predrill a number of strategic locations on the stack and then pre-install a device at each of the strategic locations so that all the following machining steps, such as the boring of a hole in the stack, may be carried out in a corresponding succession of machining steps.

In this case, for this particular use of the device 10 (among other possibilities uses thereof) the materials used in the formation of the threaded member 58 and the first and second bodies 20, 50 should be sufficient to withstand the necessary loads thereon to offset the drive forces which are otherwise applying force to the shavings against the inner surface of the aligned holes, which would otherwise cause the stack 14 to bulge or delaminate.

Figure 11:
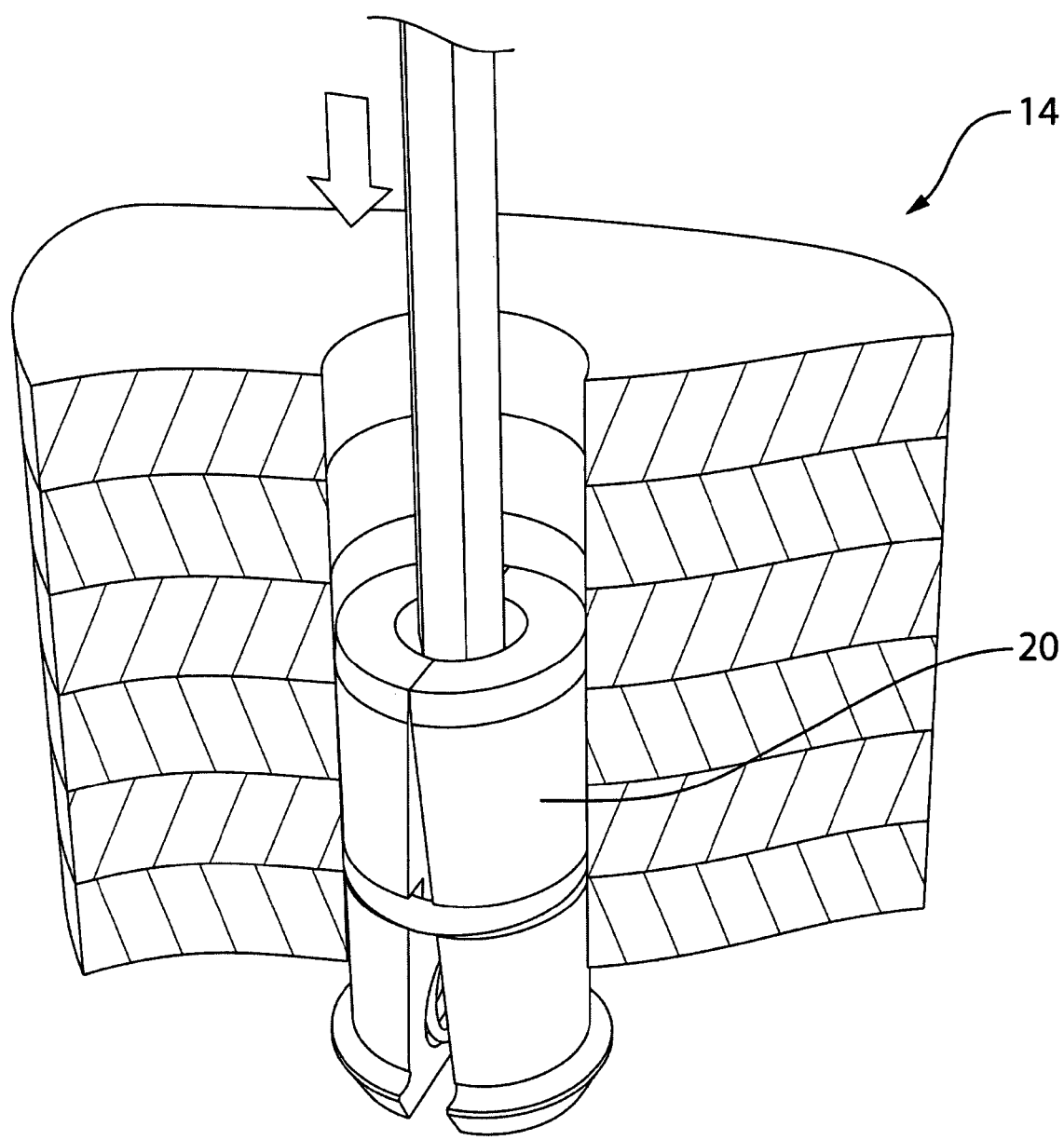
Figure 12:
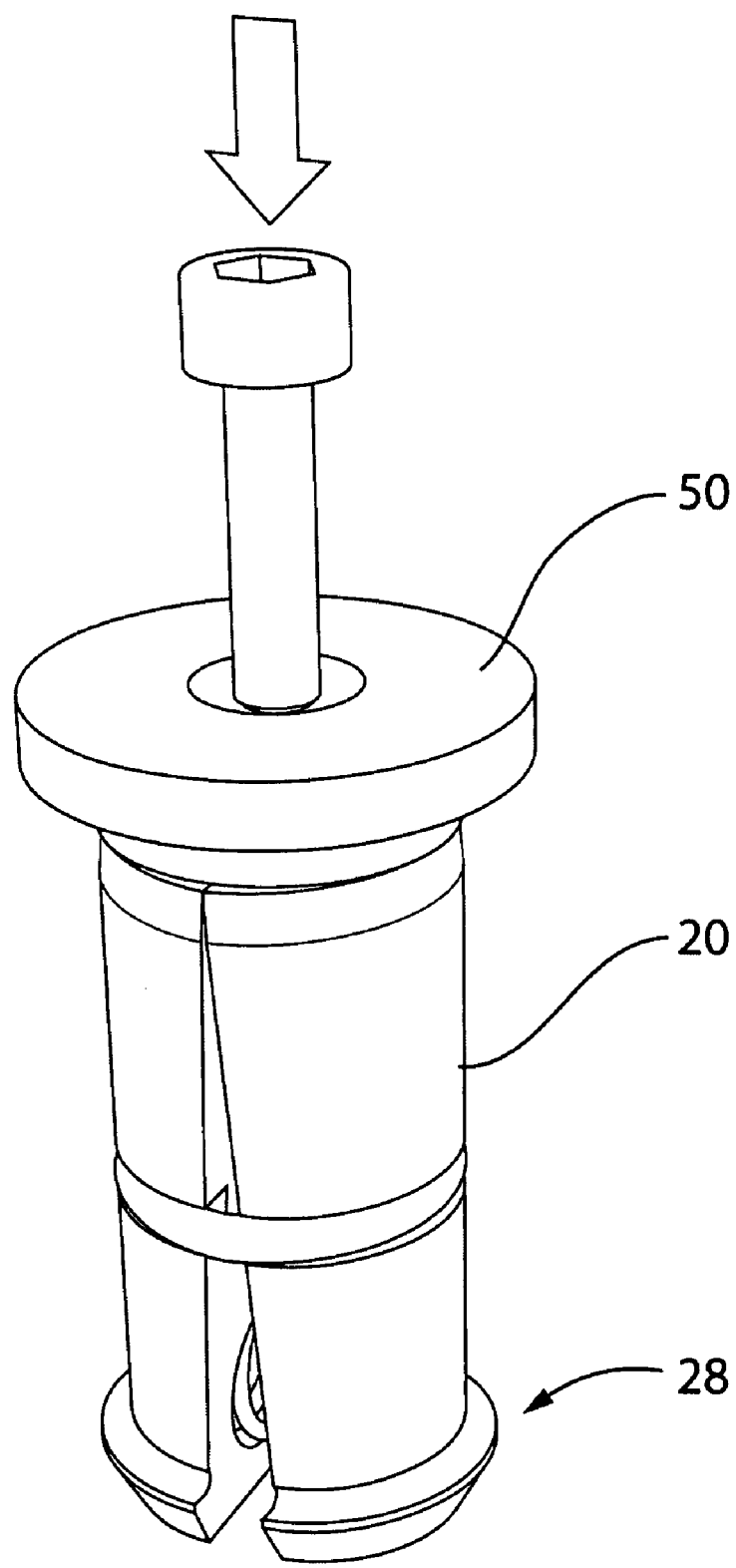

When the machining operation is complete, the user rotates the threaded member 58 to release the device 10 from the stack 14. To do this, the user displaces the first body 20 out of the aligned passages 18 as shown in FIG. 11. The user may then disassemble the plate-like work pieces from the stack.

While device is discussed with reference to holes formed in work pieces, the latter may be configured in other ways to accept the device, such as by way of slots, gaps, inner corners and the like. In this case, the device may be provided with other features to allow it to secure and clamp the work pieces together, so that the work piece has two or more opposing outer termini against which the first body can act in its expanded orientation to engage the work piece. While the device and method herein are discussed with respect to an inner path formed by the aligned passages in the work pieces, there may be some instances where the passages may not be aligned but may be of other configurations, such as offset, while still enabling a version of the device to be used successfully to clamp the work pieces. The inner passages may also be of different dimensions. For instance, the outer plate members may have relatively smaller passages while the adjacent inner plate members may have larger passages.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A device for securing work pieces comprising a first body and a second body, the first body including at least two opposed body sections, a resiliently compressible biasing portion arranged to allow an outer diameter of the first body to contract allowing passage within a plurality of aligned openings in said work pieces, a restraining portion for preventing the first body from expanding beyond an operable expanded orientation, the first body including a segment of an engagement portion near a first end thereof, the engagement portion including an operative surface to engage an outer surface on a first outer work piece, the first body having a second end and a threaded inner support extending between the opposed body sections, the second body being operable to engage an outer surface on a second outer work piece, the second body including a passage to receive a threaded member to engage the threaded inner support, the threaded member being rotationally operational to draw the first body toward the second body.

2. A temporary securing device for plate-like work pieces comprising a first body including at least two body sections maintained in an operable aligned configuration against a laterally outward bias by a limiting portion and a second body having a second passage;
   the least two body sections each having a first end region and a second end region;
   the second body portion having a cross-sectional dimension greater than the diameter of an opening located in the work piece;
   the at least two body sections each having a peripheral lateral surface and an inner surface, the inner surface defining a portion of a central cavity with a central opening located near the second end region;
   the first and second body portions being provided in an arrangement so as to align the second passage and the central opening for receiving respectively therethrough and therein a threaded member for engaging a first threaded passage located in an anchor portion operably maintained between the at least two body sections near the second end region;
   a compressible biasing portion being operably maintained between the respective inner surfaces near the first end regions of the at least two body sections and being provided so as to laterally outwardly bias the first end regions;
   the at least two body sections each having an engagement portion located near the first end;
   the engagement portion having an operative surface to engage an outer surface on a first outer work piece;
   the threaded member being rotationally operational so as to draw the at least two body sections toward the second body and to outwardly laterally move the first end regions in the direction of the bias.

3. A device as defined in claim 1, wherein the engagement portion includes a peripheral lateral lip.

4. A device as defined in claim 3, wherein the operative surface of the peripheral lateral lip is inclined at its outermost edge toward the second end.

5. A device as defined in claim 1, wherein the resiliently compressible biasing portion is a spring.

6. A device as defined in claim 1, wherein one or both of the body sections includes a formation to engage the resiliently compressible biasing portion.

7. A device as defined in claim 6, the formation including a first cavity in each of the body sections and near the first end.

8. A device as defined in claim 1, wherein the threaded member has a length corresponding to a depth of the plurality of openings.

9. A device as defined in claim 1, wherein the threaded member is a bolt.

10. A device as defined in claim 1, wherein the second body includes a cap having a hole to receive a threaded member.

11. A device as defined in claim 1, wherein the first body includes a second cavity to receive the threaded inner support.

12. A device as defined in claim 1, wherein the threaded inner support is a nut or a bobbin.

13. The device as defined in claim 2, wherein the peripheral lateral surface has a taper extending between the first end region and the second end region;
the taper being narrower near the first end region.

14. A device as defined in claim 1, wherein the first body further includes an outer peripheral groove to receive the restraining portion.

15. A device as defined in claim 1, wherein the restraining portion is an o-ring.

16. A method of machining plate-like work pieces comprising:
assembling individual plate-like work pieces into a stack;
clamping an outer region of the plate-like work pieces in a manner so as not to interfere with a subsequent machining operation;
drilling at least one hole through the stack;
providing a device for securing the plate-like work pieces, the device comprising a first body and a second body, the first body including at least two opposed body sections, a resiliently compressible biasing portion arranged to allow an outer diameter of the first body to contract so as to allow passage within the at least one hole and a restraining portion for preventing the first body from expanding beyond an operable expanded orientation, the first body including a segment of an engagement portion near a first end thereof, the engagement portion including an operative surface for engaging a first outer surface on a first plate-like work piece of the stack, the first body having a second end and a threaded inner support extending between the opposed body sections, the second body being operable to engage a second outer surface on another plate-like work piece opposing the first plate-like work piece of the stack, the second body including a passage to receive a threaded member to engage the threaded inner support, the threaded member being rotationally operational to draw the first body toward the second body;
manipulating the device to laterally a contracted orientation and inserting the first body within the at least one hole such that the engagement portion extends beyond the first outer surface of the first plate-like work piece of the stack;
rotating the threadable member to draw the first body and the second body together so as to engage the engagement portion with the first outer surface and the second body with the second outer surface;
machining the stack;
releasing the device from the stack; and
disassembling the plate-like work pieces from the stack.

17. A device as defined in claim 7, the first body including a second cavity in each of the body sections and near the second end to receive the threaded inner support.

18. A device as defined in claim 17, the threaded inner support having a pair of end sections, each of which extending into the second cavity in a corresponding body section, with a threaded passage aligned with the first passage.

19. A device as defined in claim 11, the restraining portion being located along the first body at a location between the biasing portion and the threaded inner support.

20. The device as defined in claim 2, wherein the engagement portion includes a peripheral lateral lip inclined at its outermost edge toward the second end region.

21. The device as defined in claim 2, wherein the limiting portion is provided as an o-ring seated in a recess located along the first body at a location between the biasing portion and the threaded inner support and being provided for preventing the at least two body sections from expanding beyond an operable expanded orientation.

22. A method as defined in claim 16, wherein the providing step includes installing the restraining portion at a predetermined location on the first body.

23. A method as defined in claim 16, wherein the providing step includes installing the restraining portion as an o-ring in a predetermined recess on the first body.

* * * * *